US010936547B2

(12) United States Patent
Joseph

(10) Patent No.: US 10,936,547 B2
(45) Date of Patent: Mar. 2, 2021

(54) FILESYSTEM REPLICATION USING A MINIMAL FILESYSTEM METADATA CHANGELOG

(71) Applicant: Oracle America, Inc., Redwood Shores, CA (US)

(72) Inventor: Manoj Paul Joseph, Broomfield, CO (US)

(73) Assignee: Oracle America, Inc., Redwood Shores, CA (US)

( * ) Notice: Subject to any disclaimer, the term of this patent is extended or adjusted under 35 U.S.C. 154(b) by 1272 days.

(21) Appl. No.: 15/166,379

(22) Filed: May 27, 2016

(65) Prior Publication Data
US 2016/0275098 A1      Sep. 22, 2016

Related U.S. Application Data

(63) Continuation of application No. 12/569,496, filed on Sep. 29, 2009, now Pat. No. 9,378,216.

(51) Int. Cl.
*G06F 16/178* (2019.01)
*G06F 16/27* (2019.01)
*G06F 16/28* (2019.01)
*G06F 16/23* (2019.01)

(52) U.S. Cl.
CPC ........ *G06F 16/178* (2019.01); *G06F 16/2358* (2019.01); *G06F 16/275* (2019.01); *G06F 16/289* (2019.01)

(58) Field of Classification Search
CPC .... G06F 16/178; G06F 16/289; G06F 16/275; G06F 16/2358
See application file for complete search history.

(56) References Cited

U.S. PATENT DOCUMENTS

| | | | | |
|---|---|---|---|---|
| 5,680,609 A * | 10/1997 | Reinhardt | ........... | G06F 16/1787 |
| 6,067,541 A * | 5/2000 | Raju | ........... | G06F 16/10 |
| 6,345,318 B1 * | 2/2002 | Gamon | ........... | G06F 9/451 |
| | | | | 710/8 |
| 6,412,017 B1 * | 6/2002 | Straube | ........... | G06F 16/1844 |
| | | | | 719/313 |
| 6,473,767 B1 | 10/2002 | Bailey et al. | | |
| 7,222,160 B2 | 5/2007 | Hlasny | | |
| 2002/0065810 A1 * | 5/2002 | Bradley | ........... | G06F 16/1794 |
| 2007/0079126 A1 | 4/2007 | Hsu et al. | | |
| 2013/0054523 A1 * | 2/2013 | Anglin | ........... | G06F 16/27 |
| | | | | 707/624 |
| 2013/0262395 A1 * | 10/2013 | Levinshtein | ........... | G06F 16/162 |
| | | | | 707/674 |

* cited by examiner

*Primary Examiner* — Irete F Ehichioya
*Assistant Examiner* — Huen Wong
(74) *Attorney, Agent, or Firm* — Kilpatrick Townsend & Stockton LLP

(57) ABSTRACT

In general, the invention relates to replicating a source file system stored on a first memory by obtaining a first unread entry from a changelog associated with the source file system, querying the source file system using the first unread entry to obtain a current first object file status, a current first object file path, a current first parent directory status, and a current first parent directory path, determining, based on the querying, whether a first object file on the source file system has changed at some time after the execution of the first unread entry, if the first object file has not changed, performing a first action on a target file system, and if the first object file has changed, performing a second action on the target file system.

20 Claims, 11 Drawing Sheets

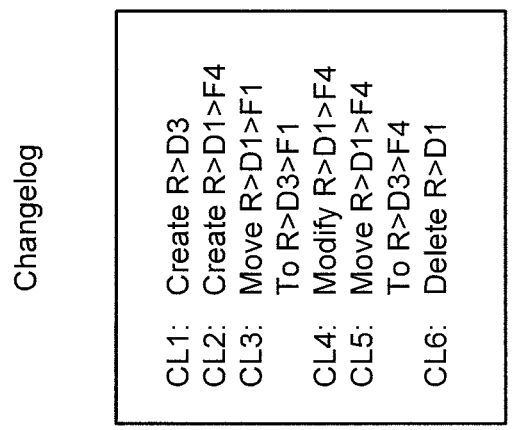
FIG. 8C
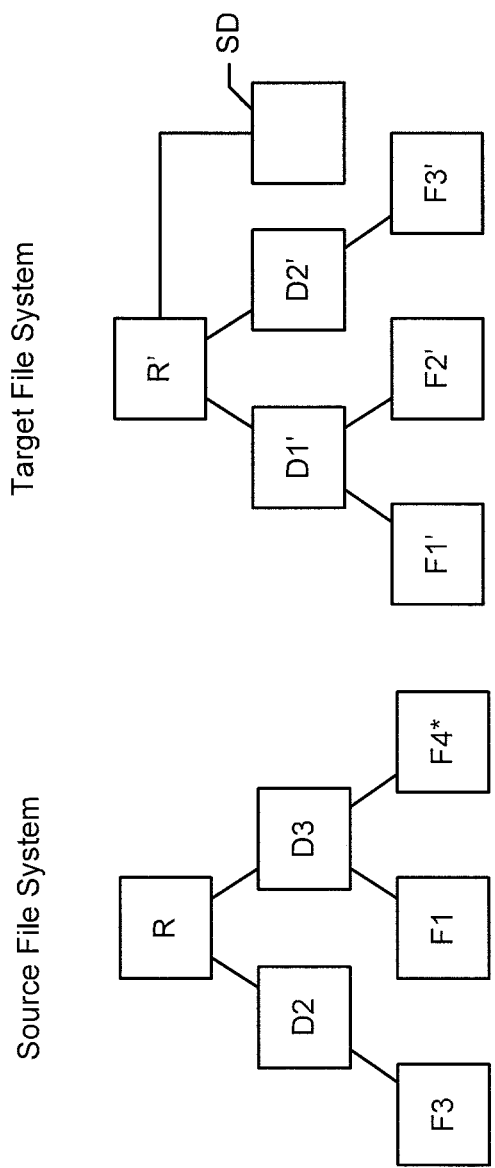
FIG. 8B
FIG. 8A

FILESYSTEM REPLICATION USING A MINIMAL FILESYSTEM METADATA CHANGELOG

This application is a continuation of U.S. application Ser. No. 12/569,496, filed Sep. 29, 2009, which issued as U.S. Pat. No. 9,378,216, and which is incorporated herein by reference.

BACKGROUND

A file system, like those found on typical operating systems, provides a mechanism for the storage and retrieval of files. In order to protect against potential loss of data on file systems, or to increase the rate at which data may be retrieved from a file system, it is often advantageous to replicate the file system. Current methods of file system replication incur significant overhead to maintain by requiring the replication mechanism to traverse the file system for changes or by requiring the process writing to the file system to also write to the replication of the file system. The costs associated with maintaining a replication of the file system may be exacerbated as file system sizes increase, and file system replications are stored in physically distant locations.

SUMMARY

In general, in one aspect, the invention relates to a computer readable medium comprising software instructions for replicating a source file system stored on a first memory, wherein the software instructions, when executed, perform a method, the method comprising: obtaining a first unread entry from a changelog associated with the source file system, wherein the changelog is a record of operations performed on the source file system, wherein the changelog comprises a plurality of unread entries, and wherein a first unread entry comprises a first operation type, a first object file identifier, a first parent directory identifier, and a first object file name; querying the source file system using the first unread entry to obtain a current first object file status, a current first object file path, a current first parent directory status, and a current first parent directory path; determining, based on the querying, whether a first object file on the source file system has changed at some time after the execution of the first unread entry; if the first object file has not changed, performing a first action on a target file system; and if the first object file has changed, performing a second action on the target file system, wherein the target file system is stored on a second memory and comprises at least a portion of the data currently stored on the source file system.

In general, in one aspect, the invention relates to system comprising: a processor a first memory storing a source file system; a source file system changelog, wherein the source file system changelog is a record of operations performed on the source file system, wherein the source file system changelog comprises a plurality of unread entries, and wherein a first unread entry of the plurality of unread entries comprises a first operation type, a first object file identifier, a first parent directory identifier, and a first object file name; a second memory storing a target file system comprising at least a portion of the data currently stored on the source file system; a replicator, when executed on a processor, is configured to perform a method, the method comprising: obtaining the first unread entry from the source file system changelog; querying the source file system using the first unread entry to obtain a current first object file status, a current first object file path, a current first parent directory status, and a current first parent directory path; determining, based on the querying, whether a first object file on the source file system has changed at some time after the execution of the first unread entry; if the first object file has not changed, performing a first action on the target file system; and if the first object file has changed, performing a second action on the target file system.

BRIEF DESCRIPTION OF DRAWINGS

FIG. 8A shows an example in accordance with one or more embodiments of the invention.

FIG. 8B shows an example in accordance with one or more embodiments of the invention.

FIG. 8C shows an example in accordance with one or more embodiments of the invention.

DETAILED DESCRIPTION

Figure 1:
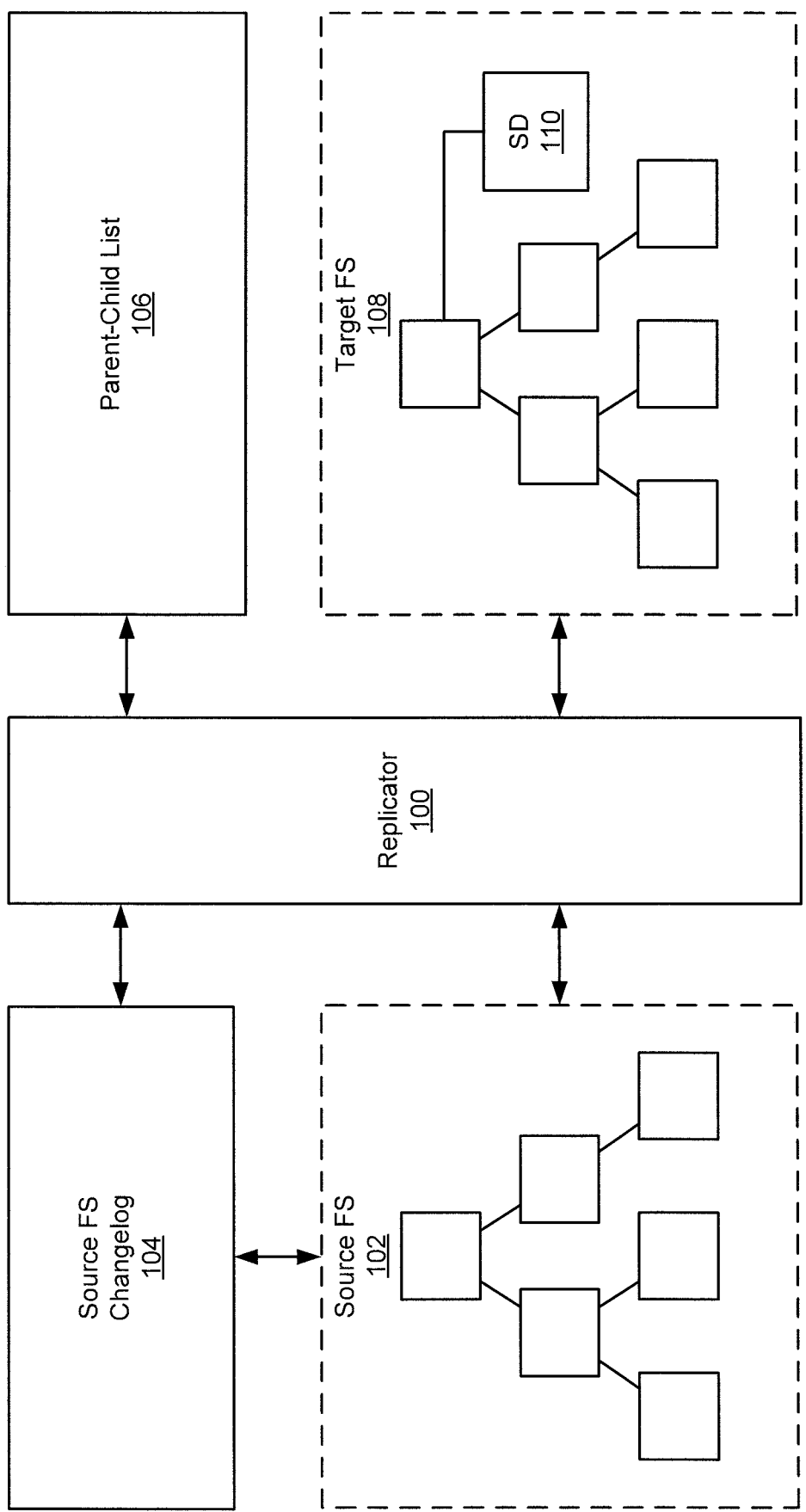
FIG. 1 shows a system in accordance with one or more embodiments of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to replicating a file system. Specifically, embodiments of the invention may relate to using a minimal file system metadata changelog to efficiently replicate a file system without scanning the file system for changes. One or more embodiments of the invention may be used to replicate a file system using the file system changelog and minimal queries to the file system.

FIG. 1 shows a system architecture in accordance with one embodiment of the invention. As shown in FIG. 1, the system architecture includes a Replicator (100), a Source File System (FS) (102), a Source FS Changelog (104), a Parent-Child List (106), and a Target FS (108). The Target FS (108) includes a Special Directory (SD) (110). Each of the components is described below.

In one or more embodiments of the invention, the Replicator (100) may be, but is not limited to, a local application (e.g., a user-level or kernel-level application) or a remote application (e.g., an application executing on a system separate from the system or systems on which the Source FS (102) and Target FS (108) are executing) connected via a network. The Replicator (100) may communicate with the Source FS (102) and Target FS (108) locally via an operating system, or remotely by using a file or block sharing protocol (e.g., Server Message Block (SMB) protocol, Network File System (NFS) protocol, etc.). In one embodiment of the invention, the Replicator (100) is configured to execute locally on the same system as the Source FS (102), on the same physical machine as the Target FS (108), or on a system separate from both the Source FS (102) and the Target FS (108). In one or more embodiments of the invention, the Replicator (100) interfaces with the Source FS (102) and/or the Target FS (108) through an operating system interface (not shown).

In one or more embodiments of the invention, the Source FS (102) is configured to receive requests for files from the Replicator (100). Specifically, in one embodiment of the invention, each file on the Source FS (102) may be associated with a unique identifier (UID). By passing the UID to the Source FS (102), the Replicator may receive the full path of the file's location. For the purposes of this application, this query is referred to as UID-to-Path. The UID may also be used to open the file associated with the UID. For the purposes of this application, this query is referred to as Open-by-UID. In one embodiment of the invention, if the Source FS (102) is queried using the UID of a file that no longer exists on the Source FS (102), the Source FS (102) will return an error. If the Replicator (100) receives an error, then the status of the file is "does not exist." If the Replicator (100) does not receive an error, then the status of the file is "exists." In one embodiment of the invention, the Replicator (100) interfaces with the Source FS (102) using only the UID-to-Path and Open-by-UID queries. In one embodiment of the invention, the Target FS (108) does not include the functionality to respond to queries using the UID.

In one or more embodiments of the invention, the Source FS Changelog (104) is configured to maintain a record of changes made to the Source FS (102). In one embodiment of the invention, entries in the Source FS Changelog (104) may record an operation to create a file on the Source FS (102), an operation to delete a file from the Source FS (102), an operation to move a file from one directory to another on the Source FS (102), or an operation to modify the data of a file on the Source FS (102). In one embodiment of the invention, each entry is one of these four types.

In one embodiment of the invention, the Source FS Changelog (104) includes one or two entries for each operation performed on the Source FS (102). For example, a create operation performed on the Source FS (102) may be represented by a single Source FS Changelog (104) entry. A move operation performed on the Source FS (102) may be represented by two entries in the Source FS Changelog (104); one entry for the original location of the file, and one entry for the destination location of the file. In one embodiment of the invention, each entry in the Source FS Changelog (104) may include an operation record number, an operation type, a UID of the file, the UID of the parent directory of the file, and the name of the file. In one embodiment of the invention, each entry in the Source FS Changelog (104) may include only an operation record number, an operation type, a UID of the target file, the UID of the parent directory of the target file, and the name of the target file. In one embodiment of the invention, the operation type may be a create operation, a remove operation, a move operation, or a set file attributes operation. For the purposes of this application, the file or directory on which an operation is performed may be referred to as the Object File.

Continuing with the discussion of FIG. 1, in one embodiment of the invention, the Target FS (108) is a replication of the Source FS (102) with the addition of the SD (110). In one embodiment of the invention, the Replicator (100) periodically updates the Target FS (108) with the changes made to the Source FS (102) since the time of the last Replicator (100) update. In one embodiment of the invention, the Target FS (108) maintains a complete copy of the Source FS (102), with the exception of the operations performed on the Source FS (102) since the last update performed by the Replicator (100).

In one embodiment of the invention, the Parent-Child List (106) is a record of the vertical relationships (e.g. the parent directory of the file, or the files stored within a directory) of files in the SD (110). Specifically, the Parent-Child List (106) may include the name of a parent directory of a file (i.e. the name of the directory in which the file is stored). The Parent-Child List (106) may include a list of child files of a directory (i.e. the names of the files stored in the directory). In one embodiment of the invention, the Parent-Child List (106) is used by the Replicator (100) to store and retrieve data related to the vertical relationships of files moved into, or out of, the SD (110). For example, the Parent-Child List (106) may include information detailing the files located in a directory which has been moved into the SD (110) or deleted from the SD (110), such that the same operation may be performed on those files. The Parent-Child List (106) may include information about a parent directory of a file in the SD (110) in the case where the parent directory has not been created at the time the file is copied to the SD (110).

In one embodiment of the invention, the Replicator (100) interfaces with the Source FS (102) using two queries. The Replicator (100) may use the UID to query the Source FS (102) to obtain the directory path of the Object File associated with the UID. The Replicator (100) may also use the UID to query the Source FS (102) to open the data stored in the file associated with the UID.

Figure 2:
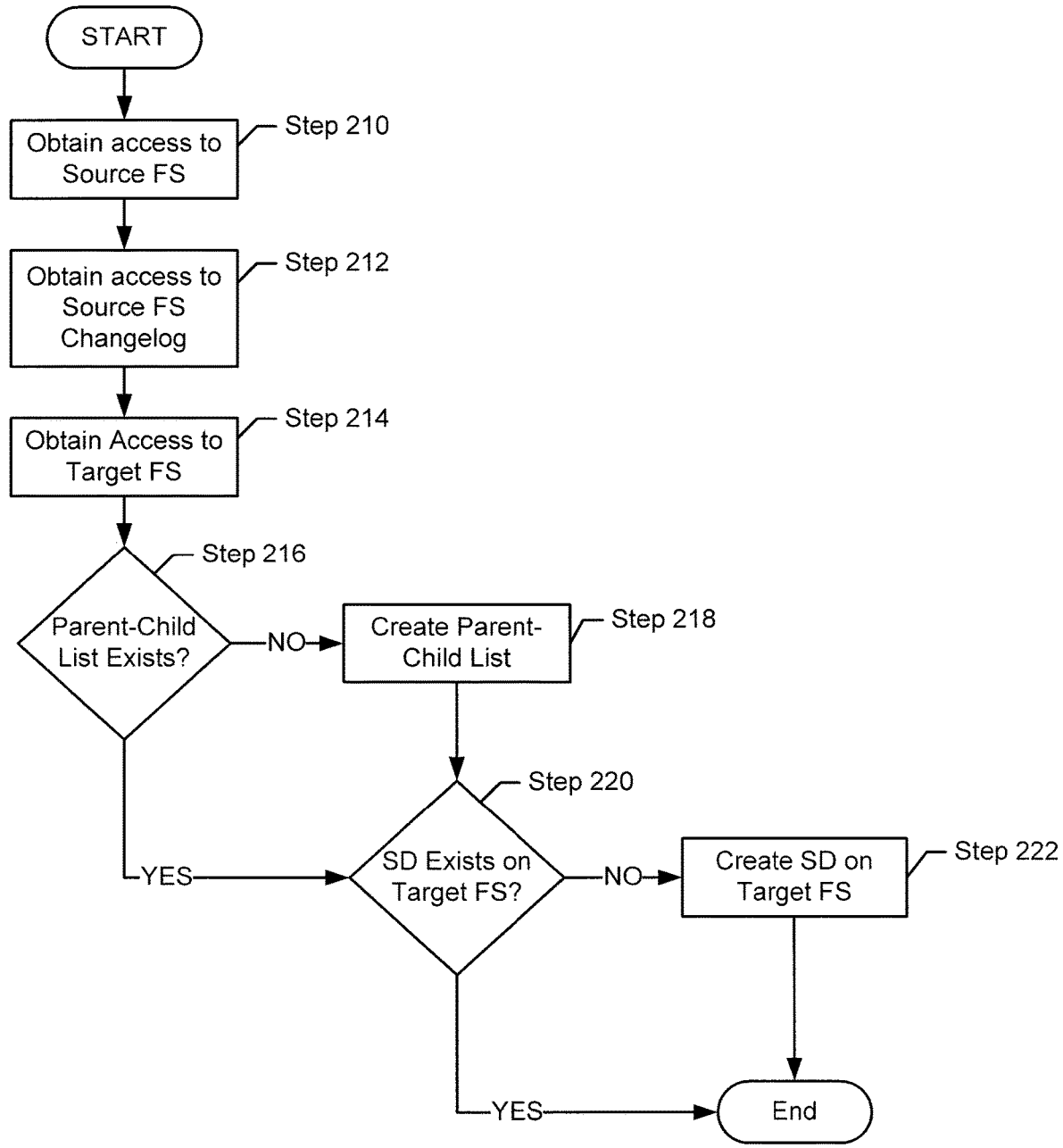
FIG. 2 shows a flowchart in accordance with one or more embodiments of the invention.

FIG. 2 shows a flow chart for initializing a Replicator in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 210, the Replicator obtains access to a Source FS (i.e. the file system to be replicated). In Step 212, the Replicator obtains access to the Source FS Changelog. In Step 214, the Replicator obtains access to a Target FS (i.e. the file system which includes a replication of the Source FS). In Step 216, the Replicator determines whether a Parent-Child List exists. If no Parent-Child List exists, then in Step 218, the Replicator creates a Parent-Child List. If a Parent-Child List already exists, or after the Replicator creates a Parent-Child List, then in Step 220, the Replicator determines whether the Target FS includes a Special Directory (SD). If no SD exists, then in Step 222, the Replicator creates a SD on the Target FS.

Figure 3:
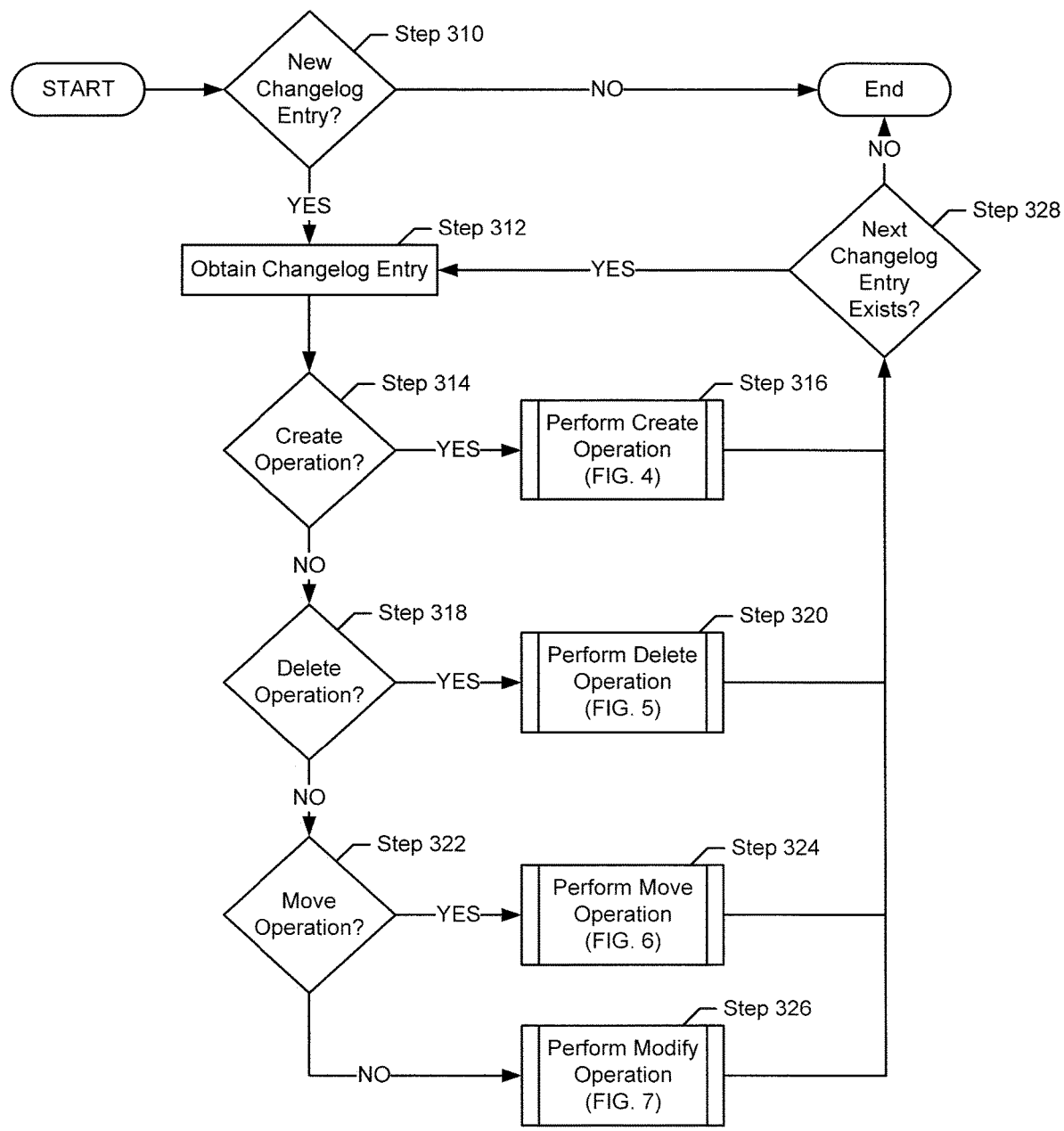
FIG. 3 shows a flowchart in accordance with one or more embodiments of the invention.

FIG. 3 shows a flow chart for processing a set of entries in the Source FS Changelog in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 310, the Replicator queries the Source FS Changelog to determine if there remains at least one unread changelog entry. If no unread changelog entries exist in the Source FS Changelog, then the flow ends. If there is at least one unread changelog entry in the Source FS Changelog, then in Step 312, the next unread changelog entry is read by the Replicator. In Step 314, a determination is made as to whether the changelog entry is a create operation. If the changelog entry is a create operation, then in Step 316, the Replicator performs the steps outlined in FIG. 4. In Step 318, a determination is made as to whether the changelog entry is a delete operation. If the changelog entry is a delete operation, then in Step 320, the Replicator performs the steps outlined in FIG. 5. In Step 322, a determination is made as to whether the changelog entry is a move operation. If the changelog entry is a move operation, then in Step 324, the Replicator performs the steps outlined in FIG. 6. In one embodiment of the invention, a changelog entry for a move operation includes two entries: the first entry includes information about the origin location of the object file and the origin parent directory, and the second entry includes information about the destination of the object file and destination parent directory. For the purposes of this application, the two entries for a move operation are assumed to be a single entry. If the changelog entry is not a move operation, then in Step 326, the Replicator performs the steps outlined in FIG. 7.

Continuing with the discussion of FIG. 3, in one embodiment of the invention, once the steps outlined in FIG. 4, 5, 6, or 7 are complete, then in Step 328, the Replicator determines whether there is at least one unread changelog entry in the Source FS Changelog. If there is at least one unread changelog entry, the flow returns to Step 312 and follows the same steps described above. If there are no unread changelog entries remaining in the Source FS Changelog, then the flow ends. In one embodiment of the invention, once the flow depicted in FIG. 3 ends, and no further changes have been made to the Source FS since the last change recorded in the changelog and processed by the Replicator, then the Target FS includes a complete replication of the Source FS. In one embodiment of the invention, if there remains only one unread changelog entry, then that operation may be applied to the Target FS directly without processing the entry using the methods described in FIG. 4, 5, 6, or 7. In one embodiment of the invention, the flow ends when there is less than two unread entries in the changelog.

In one embodiment of the invention, each entry process operation (Steps 316, 320, 324, 326, and FIGS. 4, 5, 6, and 7) describes the process for applying the changelog entry to the Target FS in a manner that accounts for subsequent changes to the Source FS. By taking into account the possibility of subsequent changes to the Source FS, embodiments of the invention avoid errors that may occur when an operation described by a changelog entry is directly applied to a file in a Target FS that has been subsequently moved, modified or deleted. In one embodiment of the invention, in accounting for subsequent changes, the invention avoids inefficiencies created by applying operations that are rendered unnecessary by subsequent operations. For the purposes of this application, the term "change" as applied to an object file means moving, modifying, or deleting the file. For the purposes of this application, the term "action" means one or more of the steps described in reference to FIGS. 4, 5, 6, and 7.

Figure 4:
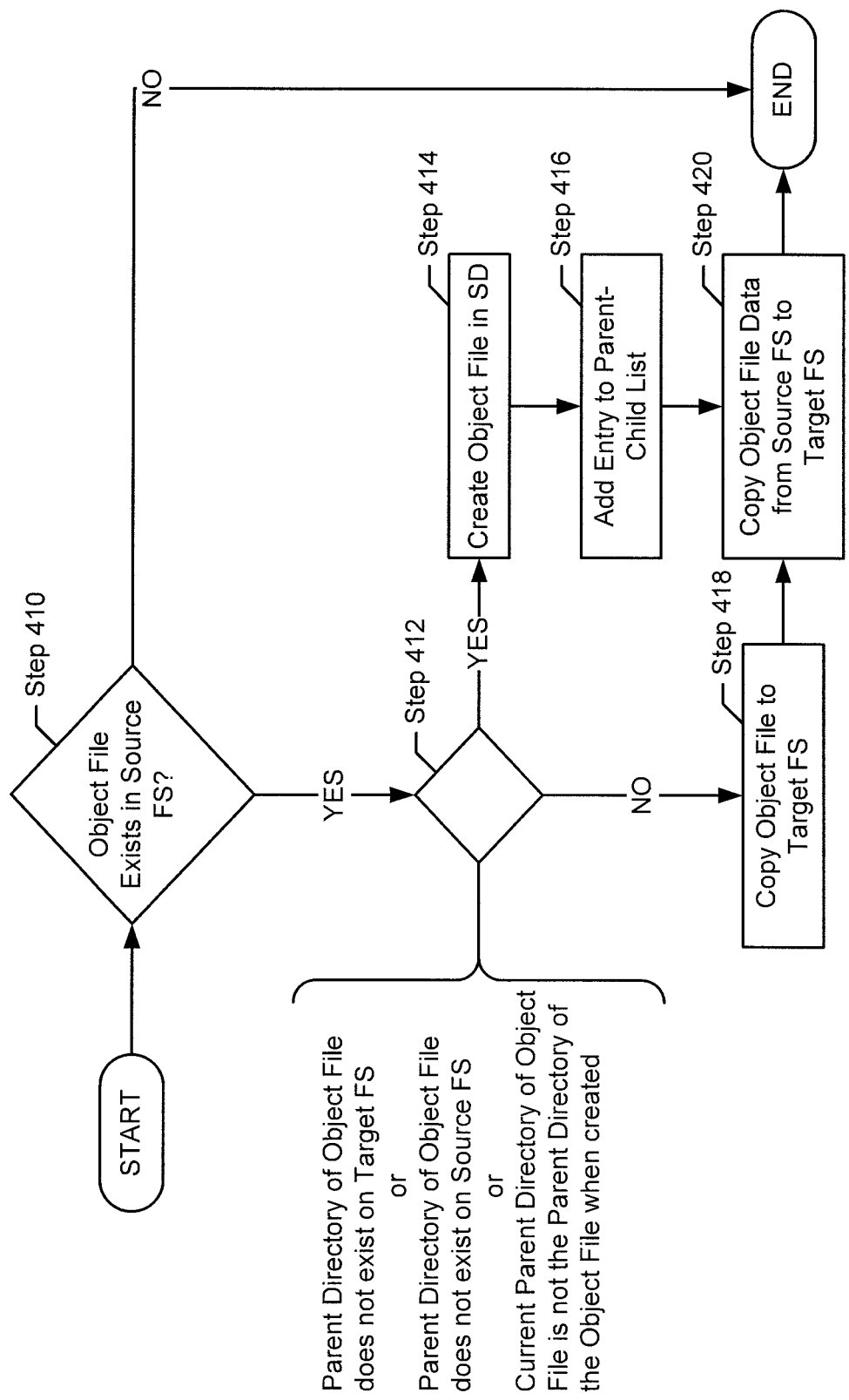
FIG. 4 shows a flowchart in accordance with one or more embodiments of the invention.

FIG. 4 shows a flow chart for processing a create changelog entry in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In Step 410, the Replicator queries the Source FS to determine if the Object File currently exists on the Source FS. If the Object File no longer exists (i.e. it has been deleted), then the flow ends. If the Object File still exists on the Source FS, then in Step 412, a determination is made as to whether to copy the file to the SD. If (1) the parent directory of the Object File does not currently exist on the Target FS; or (2) the parent directory of the Object File does not currently exists on the Source FS; or (3) the current parent directory of the Object File on the Source FS is not the parent directory of the Object File at the time the Object File was created, then in Step 414, the Object File is created in the SD. In Step 416, an entry to the Parent-Child List is made listing the Parent Directory of the Object File when created. If none of the queries at Step 412 return true, then in Step 418 the Object File is created within the same Parent Directory on the Target FS. In Step 420, data from the Object File is copied from the Source FS to the Object File in the SD.

Figure 5:
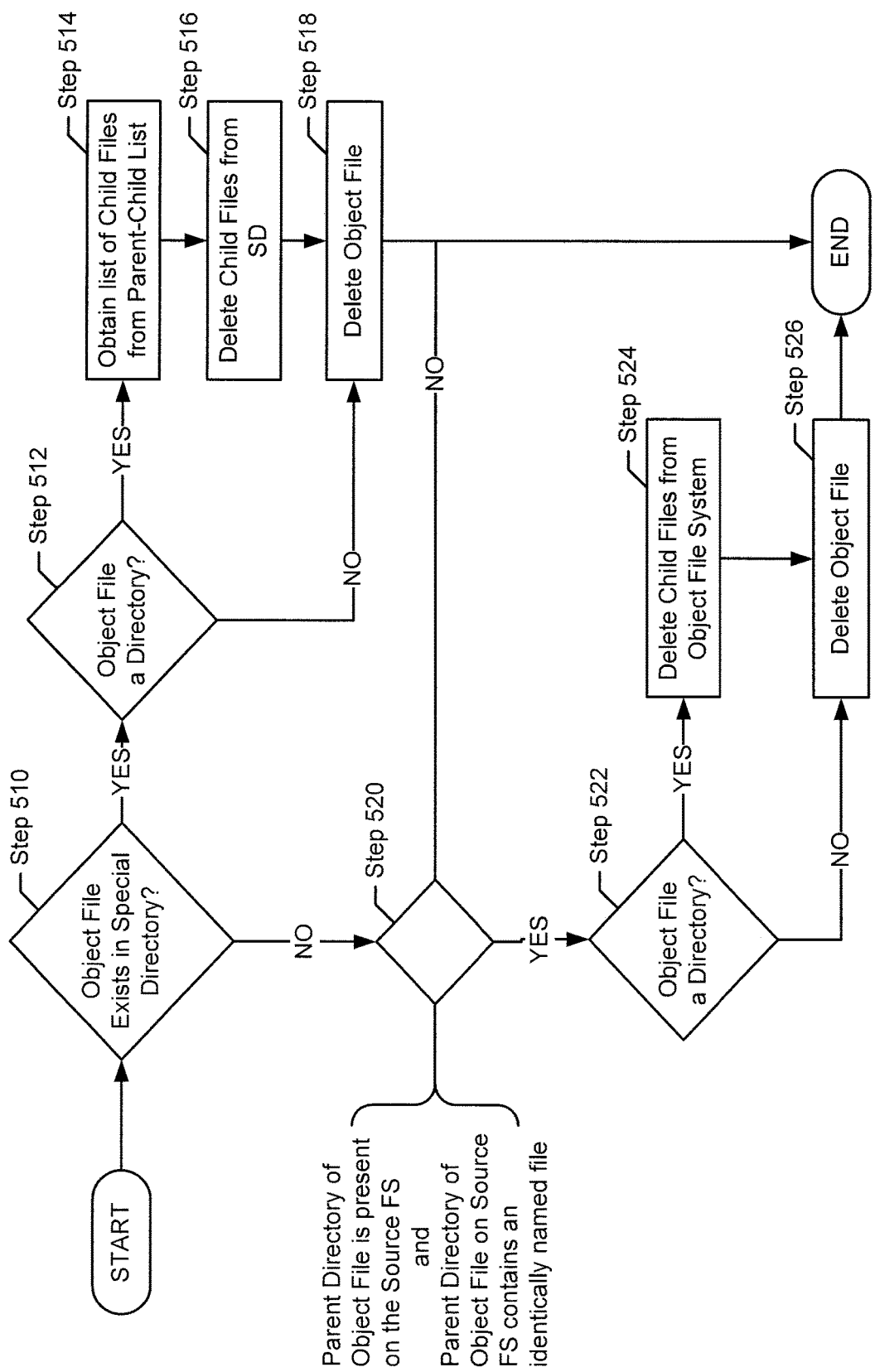
FIG. 5 shows a flowchart in accordance with one or more embodiments of the invention.

FIG. 5 shows a flow chart for processing a delete changelog entry in accordance with one or more embodiments of the invention. In one or more embodiments of the invention, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention.

In Step 510, the Replicator determines whether the Object File exists in the SD. If the Object file does exists in the SD, then in Step 512, a determination is made as to whether the Object File is a file or directory. If the Object File is a directory, then in Step 514 the Replicator obtains a list of Child Files (files stored in the Object File) from the Parent-Child List. In Step 516, the Child Files are deleted from the SD. In Step 518, the Object File is Deleted. If at Step 512, a determination is made that the Object File is not a directory, then at Step 518, the Object File is deleted.

If at Step 510, the Replicator determines that the Object File does not exist in the SD, then in Step 520 the Replicator queries the Source FS to determine whether another file with the same name still exists in the Parent Directory of the Object File (e.g. a file was subsequently created or renamed with the same name in the same location as the Object File). If (1) the Parent Directory of the Object File is currently present on the Source FS; and (2) the Parent Directory of the Object File on the Source FS includes a file with the same name as the Object file, then in Step 522, a determination is made as to whether the Object File is a directory. If the Object File is a directory, then in Step 524, the Child Files are deleted from the Target FS, and in Step 526, the Object File is deleted from the Target FS. If the Object File is not a directory, then in Step 526, the Object File is deleted from the Target FS. If one or both of the queries at Step 520 return false, then the flow ends.

Figure 6:
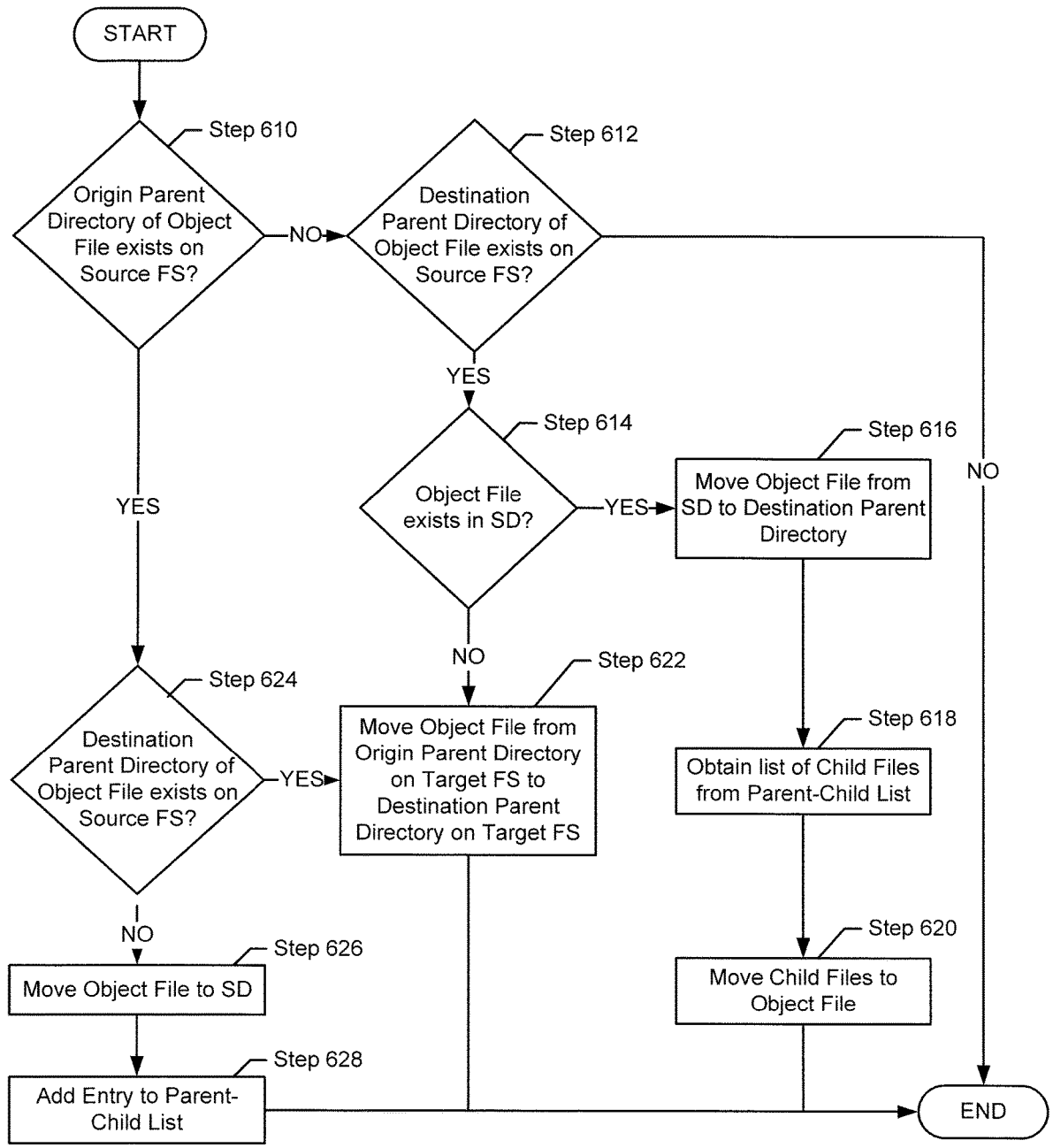
FIG. 6 shows a flowchart in accordance with one or more embodiments of the invention.

FIG. 6 shows a flow chart for processing a move changelog entry in accordance with one or more embodiments of the invention. In one or more embodiments of the invention, one or more of the steps shown in FIG. 6 may be omitted, repeated, and/or performed in a different order than that shown in FIG. 6. Accordingly, the specific arrangement of steps shown in FIG. 6 should not be construed as limiting the scope of the invention.

For the purposes of this application, the term Origin Parent Directory refers to the parent directory of the Object File prior to moving that file. The term Destination Parent Directory, for the purposes of this application, refers to the parent directory of the Object File after the file has been moved.

In Step 610, the Replicator determines whether the Origin Parent Directory of the Object File currently exists on the Source FS. If the Origin Parent Directory no longer exists on the Source FS, then in Step 612, the Replicator determines whether the Destination Parent Directory currently exists on the Source FS. If neither the Origin Parent Directory nor the Destination Parent Directory currently exist on the Source FS, then the flow ends.

If at Step 612, the Replicator determines that the Destination Parent Directory currently exists on the Source FS, then at Step 614, the Replicator queries the Target FS to determine whether the Object File exists in the SD. If the Object File exists in the SD, then in Step 616, the Replicator moves the Object File from the SD to the Destination Parent Directory on the Target FS. In Step 618, the Replicator obtains a list of any Child Files associated with the Object File. In Step 620, the Child Files are moved to the Object File. If at Step 614 the Replicator determines that the Object File does not currently exists in the SD, then in Step 622, the Replicator moves the Object File from the Original Parent Directory on the Target FS to the Destination Parent Directory on the Target FS.

If at Step 610, the Replicator determines that the Origin Parent Directory currently exists on the Source FS, then at Step 624, the Replicator determines whether the Destination Parent Directory of the Object File currently exists on the Source FS. If the Destination Parent Directory currently exists on the Source FS, then in Step 622, the Replicator moves the Object File from the Origin Parent Directory on the Target FS to the Destination Parent Directory on the Target FS. If at Step 624, the Replicator determines that the Destination Parent Directory does not currently exist on the Source FS, then at Step 626, the Replicator moves the Object File to the SD. In Step 628, an entry is added to the Parent-Child List listing the Object File as a Child File of the Destination Parent Directory that does not yet exist.

Figure 7:
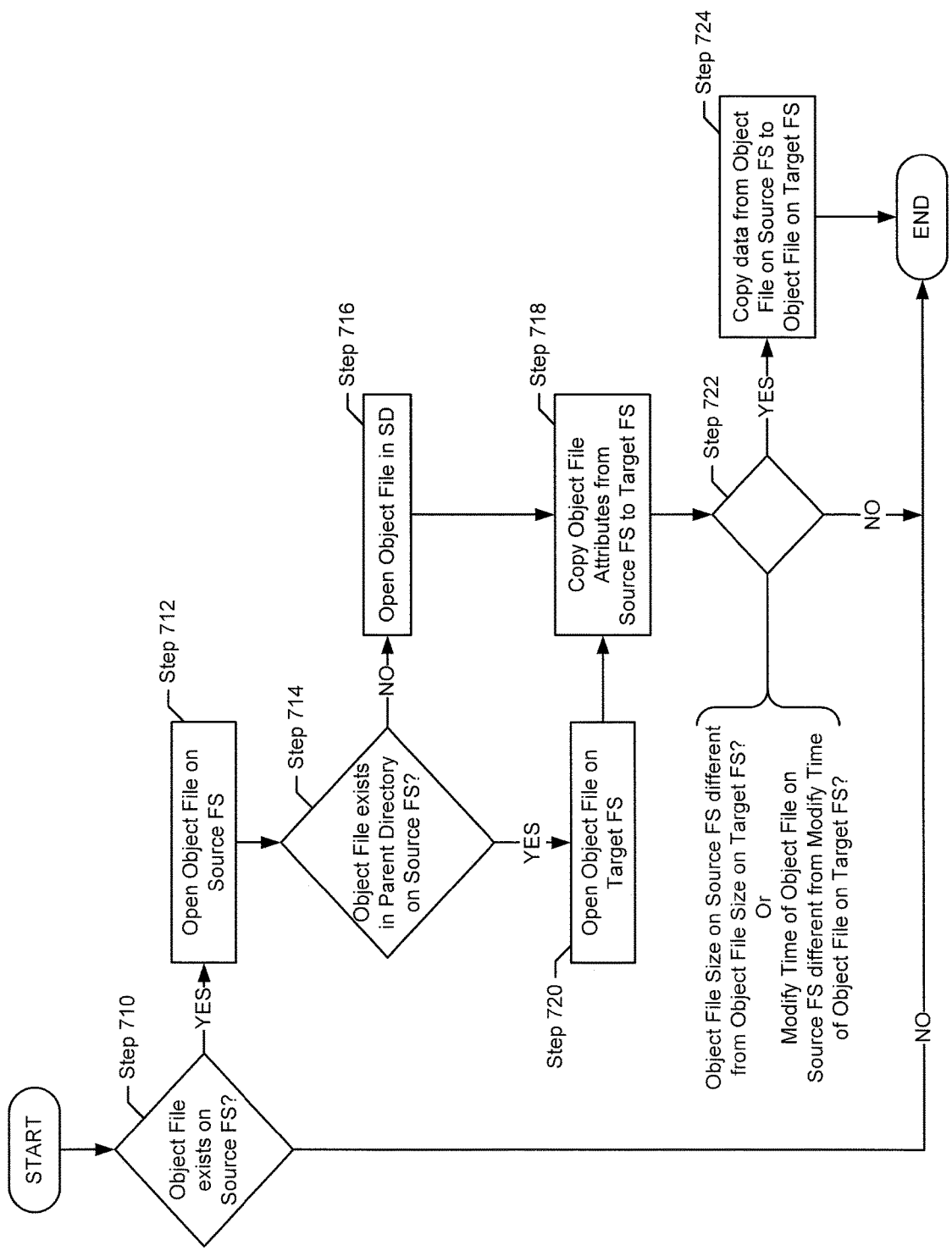
FIG. 7 shows a flowchart in accordance with one or more embodiments of the invention.

FIG. 7 shows a flow chart for processing a modify changelog entry in accordance with one or more embodiments of the invention. In one or more embodiments of the invention, one or more of the steps shown in FIG. 7 may be omitted, repeated, and/or performed in a different order than that shown in FIG. 7. Accordingly, the specific arrangement of steps shown in FIG. 7 should not be construed as limiting the scope of the invention.

In Step 710, the Replicator determines whether the Object File exists on the Source FS. If the Object file does not exist on the Source FS, then the flow ends. If the Object File does exist on the Source FS, then in Step 712, the Replicator opens the Object File on the Source FS. In one embodiment of the invention, the Replicator uses the Open-by-UID query to open the Object File on the Source FS. In Step 714, the Replicator determines whether the Object File currently exists in the same location on the Target FS as the Source FS. If the Object File does not exist in the same Parent Directory on the Source FS as the Target FS, then in Step 716, the Object File is obtained from the SD and opened. At Step 718, the Replicator copies the file attributes from the Object File on the Source FS to the Object File on the Target FS. If at Step 714, the Replicator determines that the Object File does exist in the same Parent Directory on the Source FS as the Target FS, then in Step 720, the Object File is obtained from the Target FS and opened. At Step 718, the Replicator copies the file attributes from the Object File on the Source FS to the Object File on the Target FS.

In Step 722, the Replicator determines whether the Object File on the Source FS has been altered from the version of the Object File on the Target FS. If (1) the size of the Object File on the Source FS is different from the size of the Object File on the Target FS; or (2) the modify time of the Object File on the Source FS is different from the modify time of the Object File on the Target FS, then at Step 724, the data from the Object File on the Source FS is copied to the Object File on the Target FS. If at Step 722, the Replicator determines that neither the size nor the modify time of the Object File on the Source FS has changed from the version of the Object File on the Target FS, then the flow ends.

FIGS. 8A, 8B, and 8C show an exemplary Source FS, Target FS, and Changelog, respectively, in accordance with one embodiment of the invention. The exemplary system is not intended to limit the scope of the invention. Further, some elements unnecessary for the purposes of the exemplary figure may have been omitted.

Exemplary FIG. 8A depicts the Source FS to be replicated. As depicted in FIG. 8A, the exemplary Source FS includes root node R, and directories D2 and D3. Directory D2 includes file F3, and directory D3 includes files F1 and F4. F4 has been modified since the last time the Source File System has been replicated. This modified version of file F4 is depicted as F4*.

Exemplary FIG. 8B depicts the Target FS. The Target FS depicted in FIG. 8B is a replication of the Source FS prior to the execution of the operations cataloged in the Changelog (FIG. 8C). As depicted in FIG. 8B, the exemplary Target FS includes root node R', and directories D1' and D2'. Directory D1' includes files F1' and F2', and directory D2' includes file F3'. Root node R' also includes a Special Directory (SD).

Figure 8D:
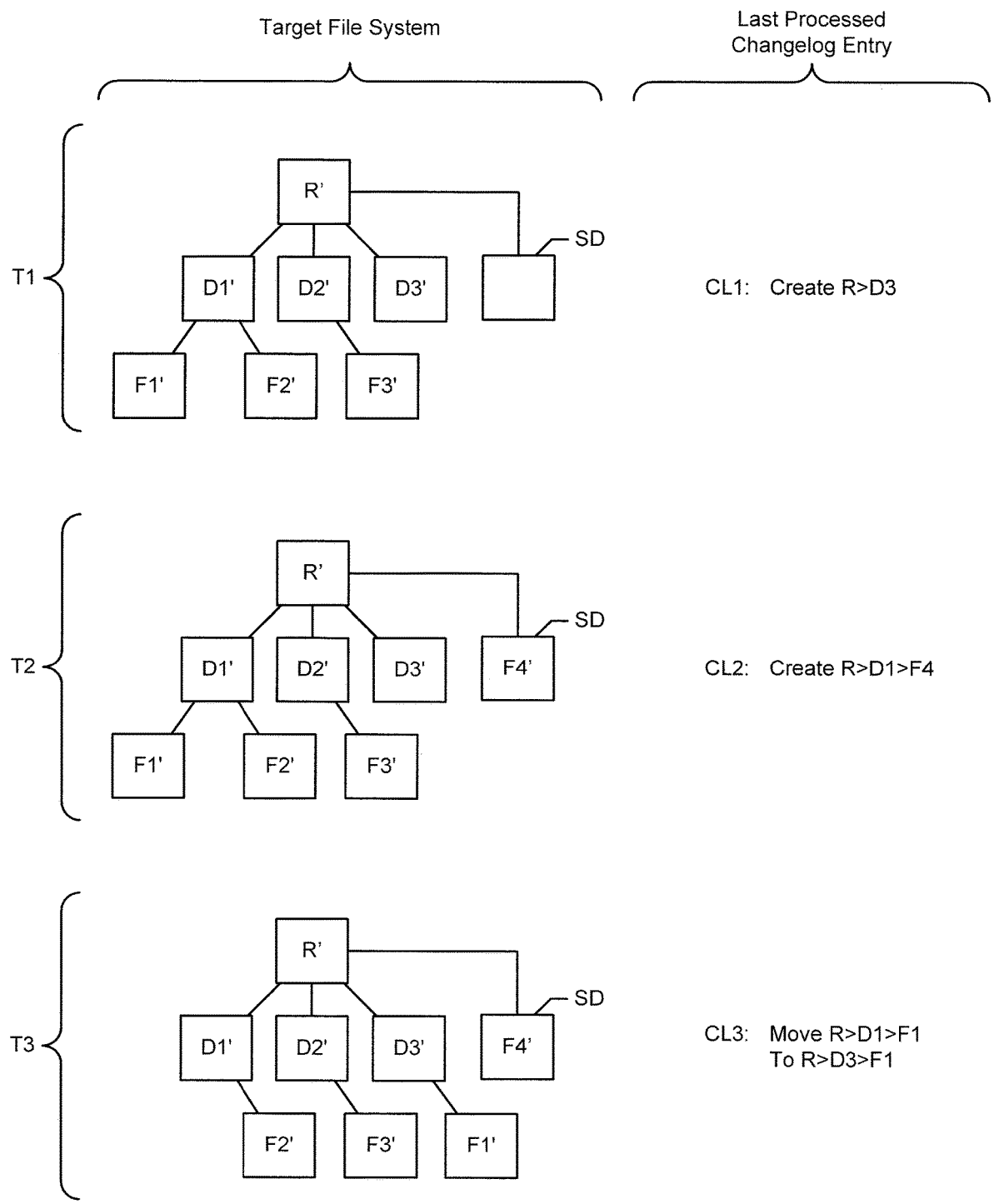
FIG. 8D shows an example in accordance with one or more embodiments of the invention.
Figure 8E:
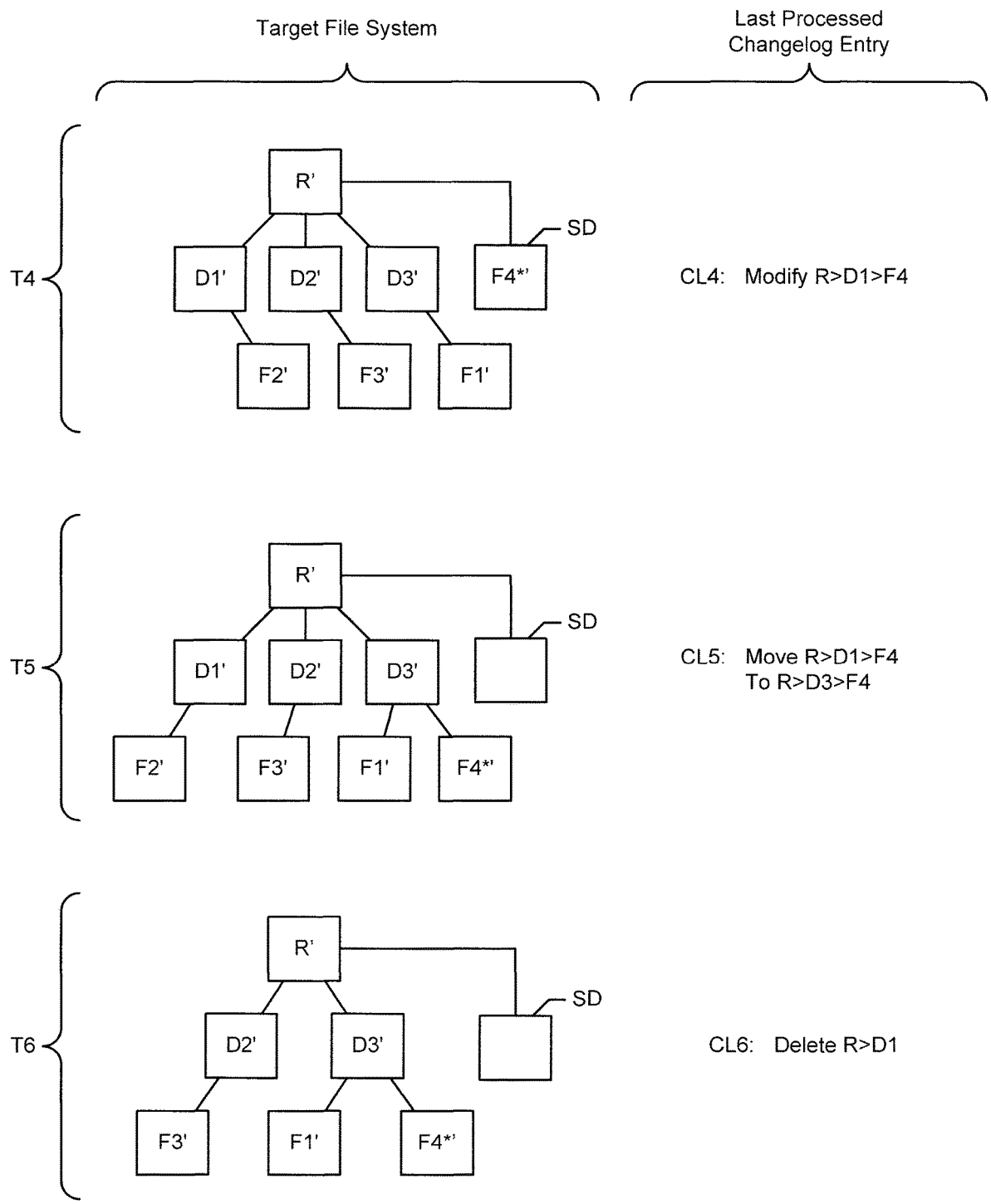
FIG. 8E shows an example in accordance with one or more embodiments of the invention.

Exemplary FIG. 8C depicts the Changelog. The Changelog catalogs the changes made to the Source FS. Exemplary FIGS. 8D and 8E depict the changes made to the Target FS as each Changelog entry is processed by the Replicator. FIG. 8B depicts the Target FS at time T0. Each new entry read from the Changelog is processed according to the steps in FIG. 3.

Turning to Exemplary FIG. 8D, at some time prior to time T1, Changelog entry CL1 is processed by the Replicator using the steps described in the Create File flowchart (FIG. 4). The Object File is directory D3 and the parent directory is R. The Replicator queries the Source FS to determine that D3 exists on that file system. None of the exceptions are true that would necessitate copying D3 to the SD, therefore D3 and its data are copied from the Source FS to the Target FS.

Continuing with the discussion of Exemplary FIG. 8D, at some point prior to T2, Changelog entry CL2 is processed by the Replicator using the steps described in the Create File flowchart (FIG. 4). The Object File is file F4 and the Parent Directory is D1. The File System Replicator queries the Source FS to determine that F4 exists on that file system. The Parent Directory (D1) of the Object File (F4) does not exist on the Source FS, therefore F4 is copied to the SD, and an entry is made in the Parent-Child List (not shown).

Continuing with the discussion of Exemplary FIG. 8D, at some point prior to T3, Changelog entry CL3 is processed by the Replicator using the steps described in the Move File flowchart (FIG. 6). The Object File is file F1 and the Origin Parent Directory is D1. The Destination Parent Directory is D3. The Replicator queries the Source FS to determine that the Origin Parent Directory (D1) does not exist on the Source FS. The Replicator then queries the Source FS to determine that the Destination Parent Directory (D3) does exist on the Source FS. The File System Replicator then queries the Target FS to determine that the Object File (F1) does not exist in the SD. The Object File (F1') is therefore moved from the Origin Parent Directory (D1') on the Target FS to the Destination Parent Directory (D3') on the Target FS.

Turning to Exemplary FIG. 8E, at some point prior to T4, Changelog entry CL4 is processed by the Replicator using the steps described in the Modify File flowchart (FIG. 7). The Object File is file F4 and the Parent Directory is D1. The Replicator opens the Object File on the Source FS. The Replicator then determines that the Object File (F4) does not exist in the Parent Directory (D3') on the Target FS, therefore the Object File (F4') is opened in the SD, and the file attributes are copied from the Source FS to the Target FS to create file F4*'. The Replicator then compares the size and last modified date of the Object File on the Source FS to the Object File on the Target FS to determine whether the data has been altered in a subsequent operation. File F4* has not be subsequently altered, so the modified data is copied from file F4* on the Source FS to file F4*' on the Target FS.

Continuing with the discussion of Exemplary FIG. 8E, at some point prior to T5, Changelog entry CL5 is processed by the Replicator using the steps described in the Move File flowchart (FIG. 6). The Object File is file F4* and the Origin Parent Directory is D1. The Destination Parent Directory is D3. The Replicator queries the Source FS to determine that the Origin Parent Directory (D1) does not exist on the Source FS. The Replicator then queries the Source FS to determine that the Destination Parent Directory (D3) does exist on the Source FS. The Replicator then queries the Target FS to determine that the object file (F4*') does exist in the SD. The Object File (F4*') is therefore moved from the SD to the destination parent directory (D3'). A list of the Child Files is obtained from the Parent-Child List (not shown) and those Child Files are copied to the Object File (F4*').

Continuing with the discussion of Exemplary FIG. 8E, at some point prior to T6, Changelog entry CL6 is processed by the Replicator using the steps described in the Delete File flowchart (FIG. 5). The Object File is directory D1 and the Parent Directory is R. The Replicator first determines that the Object File (D1') does not exist in the SD. There is no identically named file in the Parent Directory on the Source FS, therefore the object file (D1') is deleted from the Target FS. At time T6, the Target FS is identical to the Source FS.

Figure 9:
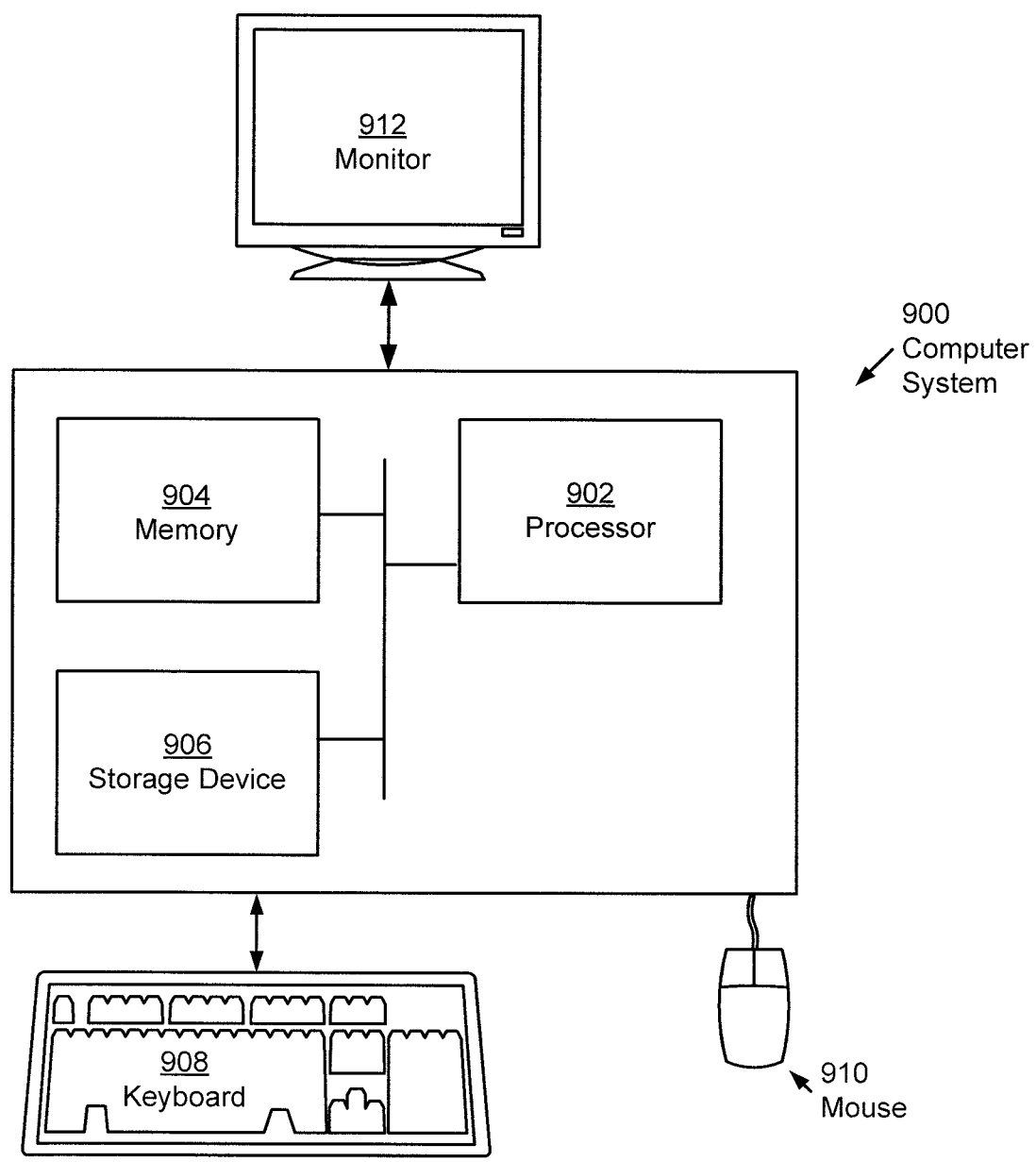
FIG. 9 shows a computer system in accordance with one or more embodiments of the invention.

The invention may be implemented on virtually any type of computer regardless of the platform being used. For example, as shown in FIG. 9, a computer system (900) includes a processor (902), associated memory (904), a storage device (906), and numerous other elements and functionalities typical of today's computers (not shown). The computer system (900) may also include input means, such as a keyboard (908) and a mouse (910), and output means, such as a monitor (912). The computer system (900) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (900) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for replicating data, comprising:
   accessing a changelog comprising a plurality of unread entries associated with a source file system stored on a first memory;
   identifying a first unread entry of the plurality of unread entries, the first unread entry including a first operation type, a first identifier of a first object file of a plurality of object files, and a second identifier of a first parent directory associated with the first object file, wherein the first operation type identifies a create operation of the first object file within the source file system;
   determining, using the first identifier, that the first object file exists on the source file system;
   in response to determining that the first object file exists in the source file system, determining, using the second identifier, that the first parent directory associated with the first object file does not exist in the source file system; and
   in response to determining that the first parent directory does not exist in the source file system:
      identifying a special directory of a target file system stored on a second memory, wherein the special directory corresponds to a portion of the second memory in which the first object file is temporarily stored; and
      copying the first object file from the source file system to the special directory of the target file system.

2. The method of claim 1, further comprising:
   identifying a second unread entry of the plurality of unread entries, the second unread entry comprising a second operation type, the first identifier of the first object file, and a third identifier of a second parent directory associated with the first object file, wherein the second operation type identifies a move operation of the first object file from the first parent directory to the second parent directory;
   determining, using the third identifier, that the second parent directory associated with the first object file exists on the source file system;
   in response to determining that the second parent directory exists in the source file system:
      accessing the first object file that is temporarily stored in the special directory of the target file system;
      copying the first object file from the special directory to a third parent directory of the target filing system, wherein the third parent directory corresponds to the second parent directory of the source file system; and deleting the first object file from the special directory.

3. The method of claim 1, further comprising, in response to determining that the first parent directory does not exist in the source file system, storing the second identifier of the first parent directory in a parent-child list, wherein the parent-child list includes a set of sub-identifiers corresponding to one or more object files that are temporarily stored in the special directory and are associated with the first parent directory.

4. The method of claim 1, wherein the source file system is located on a first node, the target file system is located on a second node, and the method is performed on a third node.

5. A non-transitory computer readable medium for replicating data, comprising instructions for:
   accessing a changelog comprising a plurality of unread entries associated with a source file system stored on a first memory;
   identifying a first unread entry of the plurality of unread entries, the first unread entry including a first operation type, a first identifier of a first object file of a plurality of object files, and a second identifier of a first parent directory associated with the first object file, wherein the first operation type identifies a create operation of the first object file within the source file system;
   determining, using the first identifier, that the first object file exists on the source file system;
   in response to determining that the first object file exists in the source file system, determining, using the second identifier, that the first parent directory associated with the first object file does not exist in the source file system; and
   in response to determining that the first parent directory does not exist in the source file system:
      identifying a special directory of a target file system stored on a second memory, wherein the special directory corresponds to a portion of the second memory in which the first object file is temporarily stored; and
      copying the first object file from the source file system to the special directory of the target file system.

6. The non-transitory computer readable medium of claim 5, wherein the source file system is located on a first node, the target file system is located on a second node, and the instructions are configured to execute on a third node.

7. A system comprising:
   a processor;
   a first memory storing a source file system;
   a second memory storing a target file system; and
   a replicator executing on the processor and configured to:
      access a changelog comprising a plurality of unread entries associated with the source file system;
      identify a first unread entry of the plurality of unread entries, the first unread entry including a first operation type, a first identifier of a first object file of a plurality of object files, and a second identifier of a first parent directory associated with the first object file, wherein the first operation type identifies a create operation of the first object file within the source file system;
      determine, using the first identifier, that the first object file exists on the source file system;
      in response to determining that the first object file exists in the source file system, determine, using the second identifier, that the first parent directory associated with the first object file does not exist in the source file system; and
      in response to determining that the first parent directory does not exist in the source file system:
         identify a special directory of the target file system, wherein the special directory corresponds to a portion of the second memory in which the first object file is temporarily stored; and
         copy the first object file from the source file system to the special directory of the target file system.

8. The system of claim 7, wherein the replicator is further configured to:
   identify a second unread entry of the plurality of unread entries, the second unread entry comprising a second operation type, the first identifier of the first object file, and a third identifier of a second parent directory associated with the first object file, wherein the second operation type identifies a move operation of the first object file from the first parent directory to the second parent directory;
   determine, using the third identifier, that the second parent directory associated with the first object file currently on the source file system;
   in response to determining that the second parent directory exists in the source file system:
      access the first object file that is temporarily stored in the special directory of the target file system;
      copy the first object file from the special directory to a third parent directory of the target filing system, wherein the third parent directory corresponds to the second parent directory of the source file system; and
      delete the first object file from the special directory.

9. The system of claim 7, wherein the replicator is further configured to, in response to determining that the first parent directory does not exist in the source file system, store the second identifier of the first parent directory in a parent-child list, wherein the parent-child list includes a set of sub-identifiers corresponding to one or more object files that are temporarily stored in the special directory and are associated with the first parent directory.

10. The system of claim 7, wherein the first memory is located on a first node, the second memory is located on a second node, and the processor is located on a third node.

11. The method of claim 1, further comprising, in response to an operation performed on the source file system, recording a new unread entry in the changelog.

12. The method of claim 3, further comprising:
   identifying a third unread entry of the plurality of unread entries, the third unread entry comprising a third operation type and the second identifier of the first parent directory, wherein the third operation type identifies a delete operation of the first parent directory from the source file system;
   accessing, using the second identifier, the set of sub-identifiers of the parent-child list;
   identifying, using the set of sub-identifiers of the parent-child list, the one or more object files temporarily stored in the special directory and are associated with the first parent directory; and
   deleting the one or more object files from the special directory.

13. The method of claim 1, further comprising:
   identifying a fourth unread entry of the plurality of unread entries, the fourth unread entry comprising a fourth operation type and the first identifier of the first object file, wherein the fourth operation type identifies a modify operation performed on the first object file from the source file system;

accessing, using the first identifier, the first object file stored in the special directory of the target file system; and modifying data of the first object file stored in the special directory of the target file system.

14. The non-transitory computer readable medium of claim 5, wherein the instructions further comprise:

identifying a second unread entry of the plurality of unread entries, the second unread entry comprising a second operation type, the first identifier of the first object file, and a third identifier of a second parent directory associated with the first object file, wherein the second operation type identifies a move operation of the first object file from the first parent directory to the second parent directory;

determining, using the third identifier, that the second parent directory associated with the first object file exists on the source file system;

in response to determining that the second parent directory exists in the source file system:

accessing the first object file that is temporarily stored in the special directory of the target file system;

copying the first object file from the special directory to a third parent directory of the target filing system, wherein the third parent directory corresponds to the second parent directory of the source file system; and deleting the first object file from the special directory.

15. The non-transitory computer readable medium of claim 5, wherein the instructions further comprise, in response to determining that the first parent directory does not exist in the source file system, storing the second identifier of the first parent directory in a parent-child list, wherein the parent-child list includes a set of sub-identifiers corresponding to one or more object files that are temporarily stored in the special directory and are associated with the first parent directory.

16. The non-transitory computer readable medium of claim 5, wherein the instructions further comprise, in response to an operation performed on the source file system, recording a new unread entry in the changelog.

17. The non-transitory computer readable medium of claim 15, wherein the instructions further comprise:

identifying a third unread entry of the plurality of unread entries, the third unread entry comprising a third operation type and the second identifier of the first parent directory, wherein the third operation type identifies a delete operation of the first parent directory from the source file system;

accessing, using the second identifier, the set of sub-identifiers of the parent-child list;

identifying, using the set of sub-identifiers of the parent-child list, the one or more object files temporarily stored in the special directory and are associated with the first parent directory; and deleting the one or more object files from the special directory.

18. The non-transitory computer readable medium of claim 5, wherein the instructions further comprise:

identifying a fourth unread entry of the plurality of unread entries, the fourth unread entry comprising a fourth operation type and the first identifier of the first object file, wherein the fourth operation type identifies a modify operation performed on the first object file from the source file system;

accessing, using the first identifier, the first object file stored in the special directory of the target file system; and modifying data of the first object file stored in the special directory of the target file system.

19. The system of claim 7, wherein the replicator is further configured to, in response to an operation performed on the source file system, record a new unread entry in the changelog.

20. The system of claim 9, wherein the replicator is further configured to:

identify a third unread entry of the plurality of unread entries, the third unread entry comprising a third operation type and the second identifier of the first parent directory, wherein the third operation type identifies a delete operation of the first parent directory from the source file system;

access, using the second identifier, the set of sub-identifiers of the parent-child list;

identify, using the set of sub-identifiers of the parent-child list, the one or more object files temporarily stored in the special directory and are associated with the first parent directory; and delete the one or more object files from the special directory.

* * * * *